(12) United States Patent
Zaugg

(10) Patent No.: US 9,714,668 B2
(45) Date of Patent: Jul. 25, 2017

(54) STAMPED TURBINE HUB WITH CENTRING TABS FOR TORQUE CONVERTER

(71) Applicant: Schaeffler Technologies GmbH & Co. KG, Herzogenaurach (DE)

(72) Inventor: Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 444 days.

(21) Appl. No.: 14/294,296

(22) Filed: Jun. 3, 2014

(65) Prior Publication Data

US 2014/0356137 A1    Dec. 4, 2014

Related U.S. Application Data

(60) Provisional application No. 61/830,761, filed on Jun. 4, 2013.

(51) Int. Cl.
| | |
|---|---|
| *F16H 45/02* | (2006.01) |
| *F15B 15/02* | (2006.01) |
| *F16H 41/24* | (2006.01) |
| *F16F 15/123* | (2006.01) |

(52) U.S. Cl.
CPC ............ *F15B 15/02* (2013.01); *F16H 41/24* (2013.01); *F16F 15/12366* (2013.01)

(58) Field of Classification Search
CPC .... F16H 45/02; F16H 2041/243; F16H 41/02; F16H 41/24; F16H 41/28; F16H 41/04; F16F 15/145; F16D 39/00; F15B 15/00; F15B 15/02; F04D 13/00; F04D 13/02; F04D 13/021; F04D 13/022; F04D 13/023; F04D 13/29

USPC ........................... 29/18; 416/118, 197 C, 180
See application file for complete search history.

(56) References Cited

U.S. PATENT DOCUMENTS

| | | | | |
|---|---|---|---|---|
| 4,639,188 A | * | 1/1987 | Swadley | ............... F01D 21/045 415/196 |
| 5,384,958 A | * | 1/1995 | O'Daniel | ............... B21D 53/80 29/889.5 |
| 5,465,575 A | * | 11/1995 | Shimmell | ............... F16H 41/28 60/345 |
| 6,142,272 A | * | 11/2000 | Meisner | ................... F16H 45/02 192/3.29 |
| 6,223,872 B1 | * | 5/2001 | Heller | ................. F16F 15/1207 192/213 |
| 7,401,688 B2 | * | 7/2008 | Fukunaga | ............... F16H 45/02 192/3.29 |

(Continued)

*Primary Examiner* — Dwayne J White
*Assistant Examiner* — Joseph Felice
(74) *Attorney, Agent, or Firm* — Volpe and Koenig, P.C.

(57) ABSTRACT

A torque converter is provided including a turbine with a turbine hub. A cover plate is fixed to the turbine hub. A damper assembly including a damper flange with an axially extending sleeve portion having a splined or toothed inner surface that is adapted to engage a transmission input shaft is provided. A spring is located between the cover plate and the damper flange for transferring torque from the turbine hub to the transmission input shaft via the damper flange. The turbine hub includes axially protruding tabs that contact an outer surface of the sleeve portion to center the turbine hub on the sleeve portion. The turbine hub also includes a radially inwardly extending portion that at least partially overlaps an axial end of the sleeve portion.

9 Claims, 1 Drawing Sheet

(56) References Cited

U.S. PATENT DOCUMENTS

| | | | | |
|---|---|---|---|---|
| 7,938,243 B2* | 5/2011 | Avins | ............ | F16H 45/02 |
| | | | | 192/204 |
| 8,739,524 B2* | 6/2014 | Brees | ............ | F16D 1/101 |
| | | | | 60/364 |
| 9,080,635 B2* | 7/2015 | Avins | ............ | F16H 41/24 |
| 2012/0266589 A1 | 10/2012 | Avins | | |

* cited by examiner

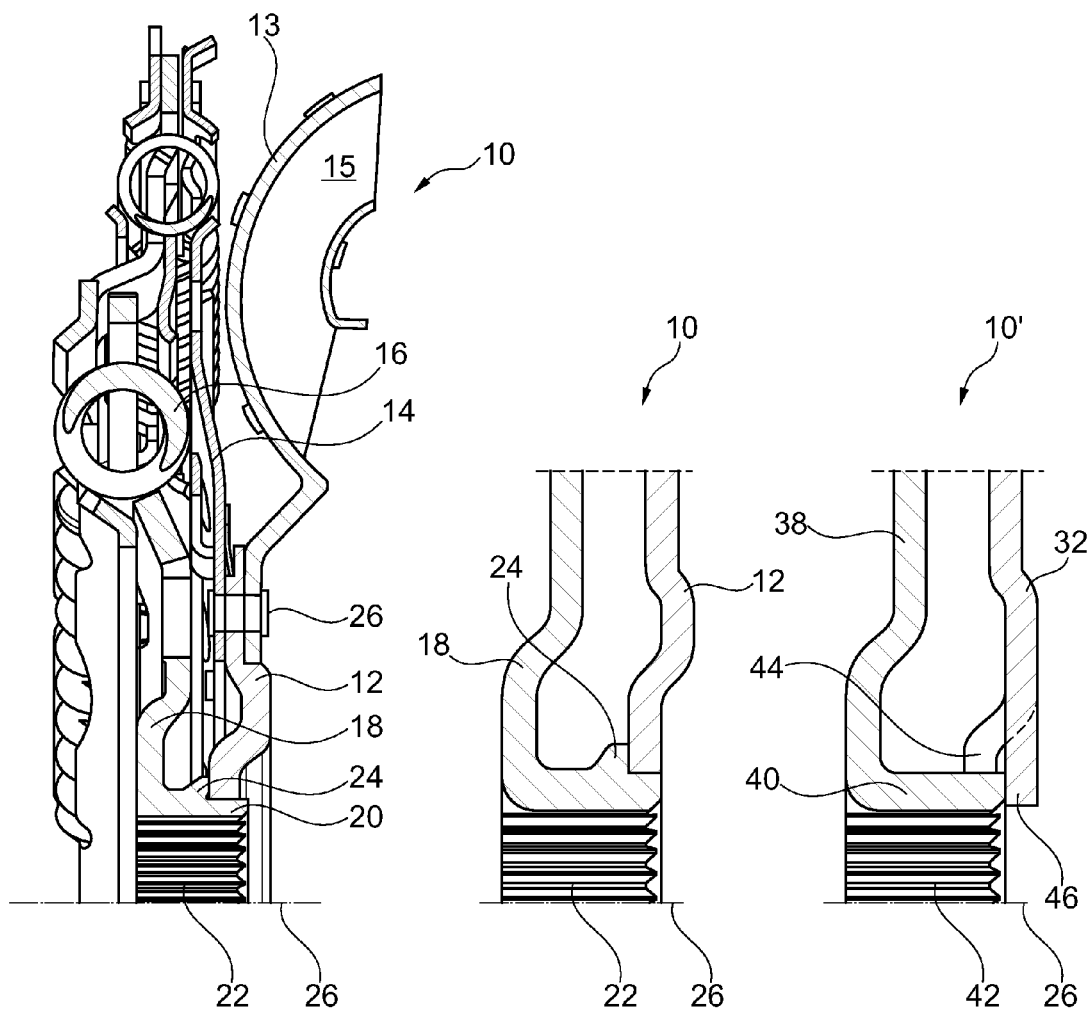

STAMPED TURBINE HUB WITH CENTRING TABS FOR TORQUE CONVERTER

INCORPORATION BY REFERENCE

The following documents are incorporated herein by reference as if fully set forth: U.S. Provisional Patent Application No. 61/830,761, filed Jun. 4, 2013.

FIELD OF INVENTION

The present invention relates to torque converters and in particular to a torque converter turbine arrangement.

BACKGROUND

Hydraulic torque converters used in connection with internal combustion engines in order to transfer torque from the engine to the transmission are known in the art.

Torque converters of the general type to which the present invention is applicable are, for example, shown in U.S. Pat. No. 6,142,272 or U.S. 2012/0266589, both of which are assigned to the Assignee of the present invention. In such torque converters, typically the torque converter housing is connected to the internal combustion engine for torque input, and includes a pump with blades on an interior thereof which can be hydraulically coupled with turbine blades connected to an associated turbine located within the torque converter. The turbine is supported via a turbine hub, which can be an integral part of the turbine or a separately connected turbine hub, typically centered about the input shaft for the transmission. The turbine hub is coupled to the input shaft via a damper assembly which includes a damper flange having a sleeve portion with inner teeth or splines which engage the input shaft. In U.S. 2012/0266589, the turbine hub is centered by riding on the sleeve portion of the damper flange and torque is transferred from the turbine to the damper flange via damper springs located between a cover plate connected to the turbine hub and the damper flange. A lock up assembly can also be provided for direct transfer of torque through additional damper springs to the damper flange. In such arrangements, a stator is also typically located between the pump and turbine blades.

FIGS. 1 and 2 show an enlarged view of one known prior art torque converter 10 with the turbine hub 12 connected to a turbine body 13, preferably via fasteners 26, such as rivets. The turbine hub 12 is centered by riding on the sleeve portion 20 of the damper flange 18. Blades 15 are connected to the turbine body 13. Here, torque is transferred from the turbine 13 via its hub 12 to a cover plate 14 fixed to the turbine hub 12, and into the damper flange 18 via spring 16 of the damper assembly. In this case, in order to transfer axial loads from the turbine hub 12 to the damper flange 18, a bulge or stop 24 is required on the sleeve portion 20, as shown, that the turbine hub thrusts against. However, this bulge or stop 24 is typically formed by a coining operation which adds expense to the manufacturing process.

Other arrangements for piloting and transmitting axial thrust into the damper flange require additional stamped components or a secondary feature in the damper flange. In the illustrated arrangement, the contact surface of the hub 12 for axial thrusting against the damper flange 18 as well as the receiving portion of the damper flange 18 generally require machining due to the tolerances and geometry after forming the damper flange. Further, coining the stop 24 on the sleeve portion 20 of the damper flange has been found to negatively impact the inside diameter of the sleeve portion typically formed as an extruded neck during the stamping process for the damper flange 18.

Accordingly, the drawbacks associated with many of these known arrangements include complex assembly as well as higher costs. Additionally, given the current drive toward efficiency, it would be desirable to provide for reduced weight and part count, as well as simplifying assembly of the torque converter.

SUMMARY

A torque converter is provided including a turbine with a turbine hub. A cover plate is fixed to the turbine hub. A damper assembly including a damper flange with an axially extending sleeve portion having a splined or toothed inner surface that is adapted to engage a transmission input shaft is also provided. A spring is located between the cover plate and the damper flange for transferring torque from the turbine hub to the transmission input shaft via the damper flange. The turbine hub includes axially protruding tabs that contact an outer surface of the sleeve portion to center the turbine hub on the sleeve portion. The turbine hub also includes a radially inwardly extending portion that at least partially overlaps an axial end of the sleeve portion.

In another aspect, the radially inwardly extending portion comprises a ring that contacts the axial end of the surface of the sleeve portion for transferring axial loads from the turbine to the damper flange.

The turbine hub can be an integral part of the turbine or can be a separately formed turbine hub that is connected to the turbine body, for example by fasteners, welding or brazing.

Preferably, the turbine hub is a stamped sheet metal part. Further, it is preferred that the tabs are formed during the stamping process and extend axially from the turbine hub to at least partially surround the sleeve portion of the damper flange for centering the turbine relative to the damper.

Preferably, a clearance fit is provided between the radially inner surface of the axially protruding tabs and the outer surface of the sleeve portion.

According to a preferred embodiment, the radially inwardly extending portion transmits axial loads generated during operation of the torque converter from the turbine to the damper flange.

A turbine assembly for a torque converter is also provided.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is a cross-section view of a portion of a torque converter in accordance with a known prior art.

FIG. 2 is an enlarged view of the turbine hub and damper flange for the prior art torque converter shown in FIG. 1.

FIG. 3 is a cross-sectional view similar to FIG. 2 showing the turbine hub and damper flange according to the present invention.

DETAILED DESCRIPTION OF THE PREFERRED EMBODIMENTS

Certain terminology is used in the following description for convenience only and is not limiting. The words "front,"

"rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In FIGS. 1 and 2, a portion of a prior art torque converter 10 is shown in cross-section. Shown are the turbine hub 12 connected to a turbine body 13 via fasteners 26. The turbine blades 15 are also connected to the turbine body, preferably via brazing. The cover plate 14 that is fixed to the turbine hub 12 and transmits torque via springs 16 of the damper assembly into the damper flange 18. While the turbine hub 12 is shown as a separate part that is joined to the turbine body, those of ordinary skill in the art will recognize that the turbine hub 12 could be formed as an integral part of the turbine body. The damper flange 18 includes a sleeve portion 20 with teeth or splines 22 on an inside surface thereof for transmitting torque to the input shaft of the transmission (not shown). The figure illustrates only a partial view of the torque converter with the center line of the input shaft being indicated at 26.

Referring now to FIG. 3, a detailed view similar to FIG. 2 is shown with the turbine hub 32 according to the invention for a torque converter 10', which is otherwise similar to the torque converter 10. The turbine hub 32 is also either fixed to or formed integrally with a turbine body (indicated at 13 in FIG. 1) in order to receive torque via a fluid coupling with the torque converter pump that is fixed to the torque converter housing. The portion of the damper assembly with the damper flange 38 according to the invention is also shown which includes the sleeve portion 40 having teeth or spines 42 for engagement with the transmission input shaft. Here, in contrast to the known prior art, the turbine hub 32 includes axially protruding tabs 44 that contact an outer surface of the sleeve portion 40 of the damper flange 38 in order to center the turbine hub 32 on the sleeve portion 40. Further, the turbine hub 32 includes a radially inwardly extending portion 46 that at least partially overlaps an axial end of the sleeve portion 40. Preferably the tabs 44 are stamped or lanced from the turbine hub 32, which is a stamped sheet metal part, and can be formed at the same time that the Turbine hub 32 is formed. In a preferred embodiment, a plurality of equally spaced tabs 44 is provided. For example, four tabs 44 can be provided spaced equally about the outer surface of the sleeve portion 40. More or less tabs 44 can be provided, as desired, depending on the particular application.

The radially inwardly extending portion 46 of the turbine hub 32 is preferably in the form of a complete ring which is adapted to contact the axial end of the sleeve portion 40 in order to transmit axial loads from the turbine to the damper flange 38. Alternatively, the radially inwardly extending portion 46 could be a series of segments separated by spaces at the locations of the tabs 44.

Preferably, there is a clearance fit between the radially inner surfaces of the axially protruding tabs 44 and the outer surface of the sleeve portion 40. This clearance fit is generally in the range of 0.3-0.6 mm, but can vary depending upon manufacturing tolerances. These tolerances can be achieved during stamping of the turbine hub 32 so that no auxiliary machining is required.

With respect to the sleeve portion 40 of the damper flange 38, this part is preferably also a stamped/extruded part wherein the sleeve portion is formed by stamping and extruding the damper flange from sheet metal during manufacture. The axial end surface of the sleeve portion 44 that makes contact with the radially inwardly extending portion 46 of the turbine hub 32 is trimmed in accordance with the typical manufacturing process but does not require additional machining, for example, such as the coining required by the prior art arrangement to form the stop 24 shown in FIGS. 1 and 2.

The present design provides advantages with respect to elimination of a separate plate for thrusting or piloting and/or removes the need for additional manufacturing steps required due to tolerances and geometry after forming the flange. Further, as no coining to form the stop 24 is required, the negative effects from this operation are eliminated.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A torque converter, comprising:
   a turbine with a turbine hub;
   a cover plate fixed to the turbine hub;
   a damper assembly including a damper flange with an integrally formed axially extending sleeve portion having a splined or toothed inner surface adapted to engage a transmission input shaft;
   a spring located between the cover plate and the damper flange;
   the turbine hub including axially protruding tabs that contact an outer surface of the sleeve portion to center the turbine hub on the sleeve portion, and the turbine hub including a radially inwardly extending portion that at least partially overlaps an axially innermost end of the sleeve portion.

2. The torque converter of claim 1, wherein the radially inwardly extending portion comprises a ring that contacts the axially innermost end of the sleeve portion.

3. The torque converter of claim 1, wherein the turbine hub is a stamped sheet metal part that is connected to the turbine.

4. The torque converter of claim 1, wherein there is a clearance fit between radially inner surfaces of the axially protruding tabs and the outer surface of the sleeve portion.

5. The torque converter of claim 1, wherein the radially inwardly extending portion is adapted to transmit axial loads from the turbine to the damper flange.

6. A turbine assembly for a torque converter, comprising:
   a turbine body;
   turbine blades connected to the turbine body;
   a turbine hub connected to the turbine body, the turbine hub including axially protruding tabs that are adapted to contact an outer surface of a sleeve portion of a damper flange to center the turbine hub on the sleeve portion, and the turbine hub including a radially inwardly extending portion that is adapted to at least partially overlap an axially innermost end of the sleeve portion.

7. The turbine assembly of claim 6, wherein the radially inwardly extending portion comprises a ring.

8. The turbine assembly of claim 6, wherein the turbine hub is a separate stamped sheet metal part that is connected to the turbine body.

9. The turbine assembly of claim 8, wherein the turbine body is connected to the turbine hub via at least one of fasteners, brazing or welding.

* * * * *